Patented Jan. 16, 1934

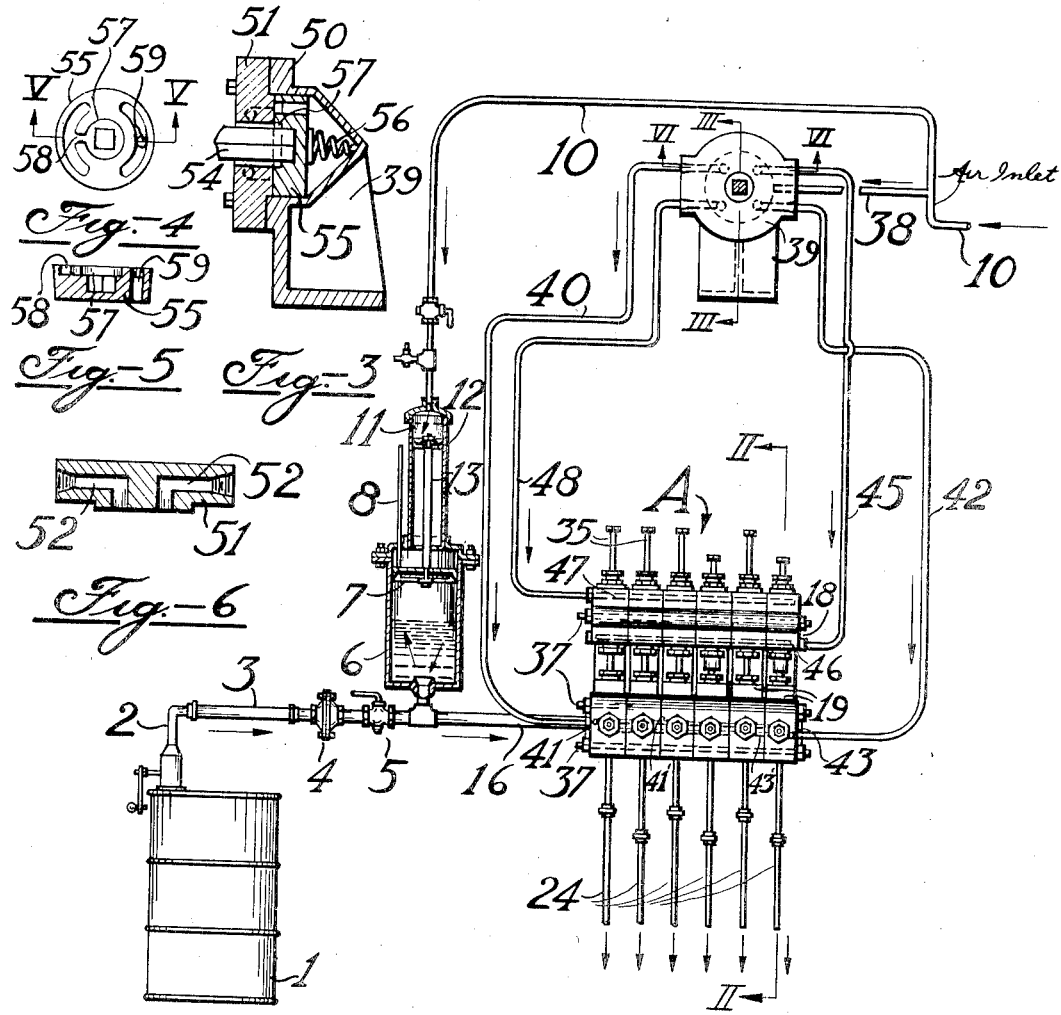

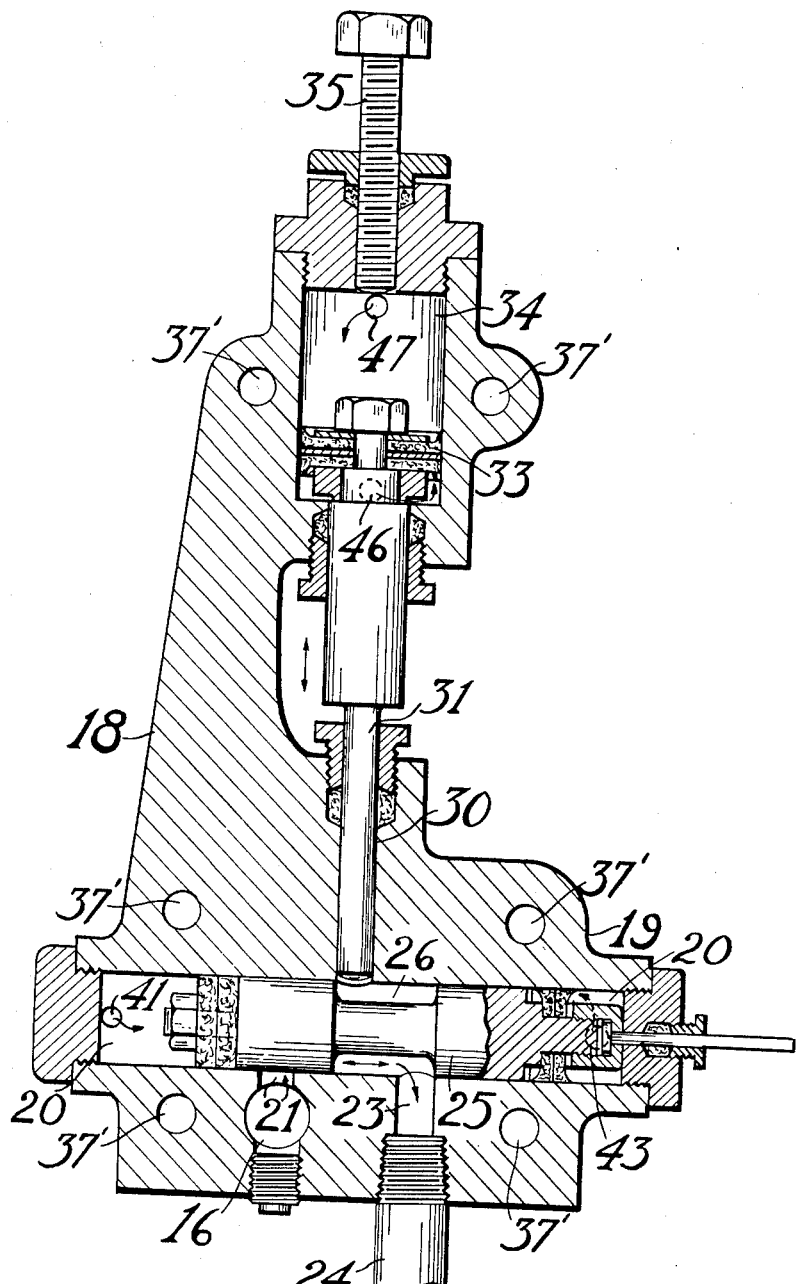

1,943,838

UNITED STATES PATENT OFFICE 1,943,838

GREASE DISTRIBUTING SYSTEM

Maurice Reswick, Pittsburgh, Pa., assignor to Pennsylvania Lubricating Company, a corporation of Delaware Application August 8, 1931. Serial No. 555,983

5 Claims. (Cl. 184—7)

This invention relates to improvements in lubricating devices and more particularly to improvements in an automatic pressure lubricating system.

The invention will be fully understood from the following description taken in connection with the accompanying drawings in which latter—

Fig. 1 is a diagrammatic view of the device with parts in section,

Fig. 2 is a longitudinal sectional view taken along the line II—II of Fig. 1 on an enlarged scale, Fig. 3 is a transverse sectional view taken along the line III—III of Fig. 1, Fig. 4 is a side elevational view of the rotary air valve unit, Fig. 5 is a transverse sectional view taken along the line V—V of Fig. 4, and Fig. 6 is a transverse sectional view taken along the line VI—VI of Fig. 1.

Referring particularly to the drawings, reference numeral 1 designates a grease drum of standard type having a pump 2 associated therewith, by means of which grease is forced under pressure through a line 3, strainer 4 and valve 5 to a reservoir 6. Reservoir 6 is of cylindrical form and contains a piston 7 which is actuated by compressed air or the like to maintain the grease in the reservoir under greater than atmospheric pressure. A gauge device 8 is associated with the piston. The compressed air actuates the piston from a line 10 which opens into a cylinder 11 of relatively small diameter as compared with the diameter of the reservoir. The compressed air actuates a piston 12 which is secured to a piston rod 13 which in turn is secured to the piston 7. The compressed air maintains the grease in the reservoir at a substantially constant moderate pressure preferably just sufficient to cause it to flow through the manifold leading to the battery of lubricators to be later described. The pressure within the reservoir may be from approximately 25 to 50 pounds per square inch depending upon the density of the lubricant.

The grease is delivered from the reservoir 6 through a manifold 16 to a battery of lubricators A. Each lubricator comprises a measuring pump 18 including a cylinder 19 having a bore 20. The manifold 16 communicates with the bore 20 through a passage 21. Outlet passage 23 communicates with the bore at a position spaced longitudinally of the bore from the inlet passage 21. A line 24 leads from the outlet passage to a suitable bearing or the like to be lubricated. A valve 25 is reciprocally mounted in the bore 20 and is provided with a groove 26 adapted to alternately communicate with the inlet passage 21 and outlet passage 23 during reciprocation of the valve.

The grease is intermittently delivered to the grease lines 24 under a potential high pressure by means of a measuring pump. The pump includes a bore 30 which communicates through the wall of cylinder 19 with the bore 20 of the cylinder at the groove 26 of valve 25. Bore 30 is in communication with the groove 26 at all positions of the valve 25. A plunger 31 is mounted for reciprocation in the bore and is formed unitary with a piston 33. Piston 33 is adapted to be reciprocated in a cylindrical bore 34 formed in the pump. The extent of reciprocation of the piston 33 can be regulated by means of an adjusting screw 35. The measuring pumps or individual lubricators are assembled together with all grease and air manifolds in register and are held together by means of bolts 37 which pass through holes 37' in the lubricators.

Reciprocation of the valve 25 and the unitary piston and plunger is effected in syncronized relation by means of compressed fluid such as compressed air or the like, by the following arrangement of parts: The compressed air is delivered from line 10 through a line 38 to a suitable valve such as a six way rotary disc valve 39. A line 40 leads from valve 39 to an inlet 41 disposed at one end of valve 25. Inlets 41 of the lubricators communicate to form an air manifold 41'. A line 42 communicates with valve 39 and an inlet 43 disposed at the opposite end of valve 25. Inlets 43 of the lubricators communicate to form an air manifold 43'. Actuation of the air control valve 39 successively opens and closes the supply of air through lines 40 and 42 and thereby reciprocates the valve 25. Admission of air through line 42 and openings 43 in manifold 43' causes the valve 25 to be moved to the left as viewed in Fig. 2, closing the outlet passage 23 and opening the inlet from the grease manifold. The plunger 31 is then withdrawn to permit the grease to flow into the pump. This is effected by the air control valve 39 which permits compressed air to flow through a line 45 to an air manifold 46. Further rotation of the air control valve causes air to be admitted to air manifold 41' to force the valve 25 to the right, as viewed in Fig. 2, and causing line 24 to communicate with the pump. Compressed air is then caused to travel through a line 48 to the air manifold 47 whereby the pump plunger is caused to force the grease from the pump through the line 24 to the bearing, not shown. This cycle of operations is repeated with each revolution of the disc in the air control valve. The air control valve 39 is the valve disclosed in my copending application Serial No. 440,533, filed March 31, 1930. The valve comprises a housing 50 closed by a plate 51. Plate 51 is provided with passageways 52 opening through the inner face of the plate and extending to its periphery. The rotary unit of the valve comprises the drive shaft 54 and head 55. The inner face of the head is held against the plate 51 by a spring 56. The inner face is provided with a centrally disposed cylindrical recess 57, communicating with exhaust port 58. An inlet port 59 extends transversely through the body. Rotation of the drive shaft 54 opens and closes the air supply as previously described.

It will be seen that the piston 33 has a larger diameter than the plunger 31 whereby a high degree of pressure can be developed upon the grease delivered from the pump. This pressure will develop when there is corresponding resistance in the line leading to the bearing. The grease follows a simple path to the bearings through ample and free passages. Heavy greases can be handled without danger of separation, breaking up of original structure, or clogging of the grease passages. Preferably the air control valve is connected through proper gearing to some revolving part of the machine to be lubricated.

Various changes may be made within the scope of the appended claims in which it is desired to claim all novelty inherent in the invention as broadly as the prior art permits.

I claim:

1. In a lubricant distributing system, a measuring pump including a valve cylinder having longitudinally spaced inlet and outlet passages and a bore intermediate said passages, a plunger reciprocable in the bore, a piston cylinder, a unitary plunger and piston reciprocable in the bore and piston cylinder respectively, a valve member reciprocably mounted in the valve cylinder and having a groove of a length less than the distance between said passages, said groove alternately establishing communication between the bore and inlet passage in one position of the valve and between the bore and the outlet passage in the other position of the valve, means for supplying lubricant under pressure to the inlet passage, a source of fluid under high pressure, fluid conduit lines leading from the source to opposite ends of the valve and piston cylinders, and a valve for directing the fluid under high pressure alternately through the lines leading to the cylinder to reciprocate the valve member whereby the inlet passage and outlet passage are successively opened and closed, and for directing the fluid under high pressure alternately through the lines leading to the piston cylinder to reciprocate the piston to draw in a charge of lubricant through the open inlet passage and eject the charge through the open outlet passage.

2. In a lubricant distributing system, a measuring pump including a valve cylinder having longitudinally spaced inlet and outlet passages and a bore intermediate said passages, a plunger reciprocable in the bore, a piston cylinder, a unitary plunger and piston reciprocable in the bore and piston cylinder respectively, a valve member reciprocably mounted in the valve cylinder and having a groove of a length less than the distance between said passages, said groove alternately establishing communication between the bore and inlet passage in one position of the valve and between the bore and the outlet passage in the other position of the valve, means for supplying lubricant under pressure to the inlet passage, a source of fluid under high pressure, fluid conduit lines leading from the source to opposite ends of the valve and piston cylinders, and a valve having passageways operative for directing fluid under high pressure in succession to the valve cylinder to open the inlet, to the piston cylinder to draw in a charge of lubricant, to the valve cylinder to open the outlet, and to the piston cylinder to move the plunger to discharge position.

3. In a lubricant distributing system, a measuring pump including a valve cylinder having longitudinally spaced inlet and outlet passages and a bore intermediate said passages, a plunger reciprocable in the bore, a piston cylinder, a unitary plunger and piston reciprocable in the bore and piston cylinder respectively, a valve member reciprocably mounted in the valve cylinder and having a groove of a length less than the distance between said passages, said groove alternately establishing communication between the bore and inlet passage in one position of the valve and between the bore and the outlet passage in the other position of the valve, means for supplying lubricant under pressure to the inlet passage, a source of fluid under high pressure, fluid conduit lines leading from the source to opposite ends of the valve cylinder, a fluid conduit line leading from the source to the end of the piston away from the bore, and a valve for directing the fluid under high pressure alternately through the lines leading to the valve cylinder to reciprocate the valve member whereby the inlet passage and outlet passage are successively opened and closed, and for directing the fluid under high pressure through the line leading to the piston cylinder to eject the charge through the open outlet passage.

4. In a lubricant distributing system, a battery of lubricators each including a measuring pump including a valve cylinder having longitudinally spaced inlet and outlet passages and a bore intermediate said passages, a plunger reciprocable in the bore, a piston cylinder, a unitary plunger and piston reciprocable in the bore and piston cylinder respectively, a valve member reciprocably mounted in the valve cylinder and having a groove of a length less than the distance between said passages, said groove alternately establishing communication between the bore and inlet passage in one position of the valve and between the bore and the outlet passage in the other position of the valve, means including a pump manifold connected to the inlet passages in parallel for supplying lubricant under pressure to the inlet passages, a source of fluid under high pressure, fluid conduit lines leading from the source to opposite ends of the valve and piston cylinders, and a valve for directing the fluid under high pressure alternately through the lines leading to the cylinders to reciprocate the valve members whereby the inlet passage and outlet passage of each lubricator are successively opened and closed, and for directing the fluid under high pressure alternately through the lines leading to the piston cylinder of each lubricator to reciprocate the pistons to draw in a charge of lubricant through the open inlet passages and eject the charge through the open outlet passages.

5. In a lubricant distributing system, a battery of lubricators each including a measuring pump including a valve cylinder having longitudinally spaced inlet and outlet passages and a bore intermediate said passages, a plunger reciprocable in the bore, a piston cylinder, a unitary plunger and piston reciprocable in the bore and piston cylinder respectively, a valve member reciprocably mounted in the valve cylinder and having a groove of a length less than the distance between said passages, said groove alternately establishing communication between the bore and inlet passage in one position of the valve and between the bore and the outlet passage in the other position of the valve, means including a pump manifold connected to the inlet passages in parallel for supplying lubricant under pressure to the inlet passages, a valve manifold connecting the one end of the valve cylinders in parallel, a valve manifold connecting the other end of the valve cylinders in parallel, a source of fluid under high pressure, fluid conduit lines leading from the source to the valve manifolds and to opposite ends of the piston cylinders, and a valve for directing the fluid under high pressure alternately through the lines leading to the valve manifolds to reciprocate the valve members whereby the inlet passages and outlet passages are successively opened and closed, and for directing the fluid under high pressure alternately through the lines leading to the opposite ends of the piston cylinders to reciprocate the pistons to draw in a charge of lubricant through the open inlet passages and eject the charge through the open outlet passages.

MAURICE RESWICK.